H. K. HITCHCOCK.
GLASS DRAWING BAIT AND THE METHOD OF USING IT.
APPLICATION FILED OCT. 23, 1917.
1,349,200.
Patented Aug. 10, 1920.
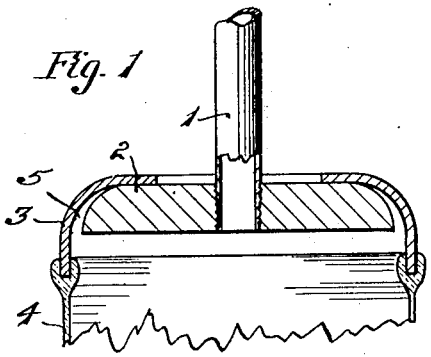
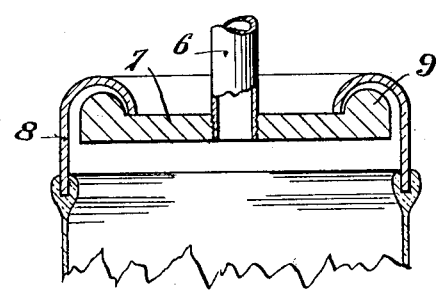
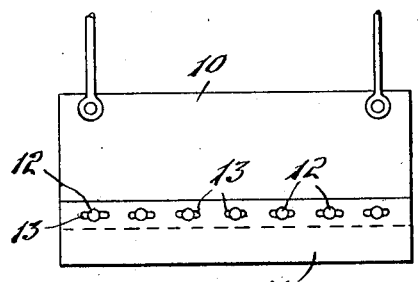
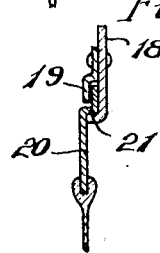
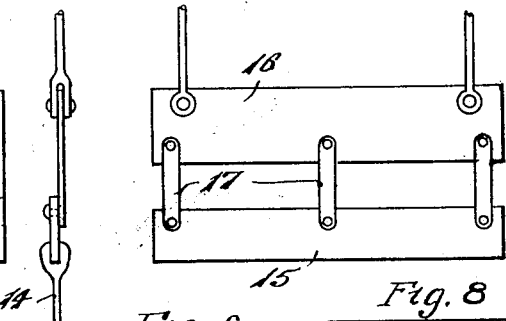
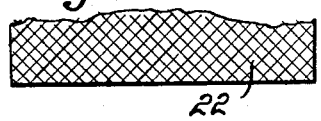
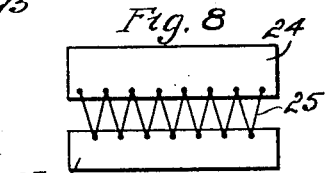
WITNESS
INVENTOR.

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

GLASS-DRAWING BAIT AND THE METHOD OF USING IT.

1,349,200. Specification of Letters Patent. Patented Aug. 10, 1920.

Application filed October 23, 1917. Serial No. 198,186.

*To all whom it may concern:*

Be it known that I, HALBERT K. HITCHCOCK, a citizen of the United States, residing at Pittsburgh, in the county of Allegheny and State of Pennsylvania, have invented certain new and useful Improvements in Glass-Drawing Baits and the Methods of Using Them, of which the following is a specification.

The invention relates to glass drawing baits and has for its principal objects; the provision of an improved bait from which the glass will not crack during the drawing operation; which is relatively cheap and durable; which may be employed to draw a full size cylinder without the usual reduced end and neck, thus saving time and giving a greater proportion of usable glass; and which does not require the skill in manipulation incident to baits requiring the formation of the reduced end and neck. Also the provision of an improved method of using the bait, whereby the preliminary heating incident to the use of the ordinary hot bait is avoided, as well as the necessity of cleaning the bait, and whereby its life is increased. Certain embodiments of the invention are illustrated in the accompanying drawings, wherein—

Figure 1 is a section through one form of the improved bait as employed for drawing cylinders; Fig. 2 is a section similar to that of Fig. 1 through a modification; Figs. 3 and 4 are front and side elevation views, respectively, of a bait embodying the invention as employed in the drawing of sheet glass; Fig. 5 is a front elevation of another modification of a sheet drawing bait; Fig. 6 is a section through still another modification for use in drawing sheet glass, and Figs. 7 and 8 show other modifications.

What are known as hot baits, as heretofore employed, wherein the glass welded to the metal bait, have had a number of serious objections which have caused this type of bait to be largely discontinued in favor of what is known as the cold bait. One of the principal objections has been due to the cracking of the glass from the bait due to the difference in the rate of shrinkage of the bait and glass as the drawing progressed. This breakage was a source of loss and limited the length to which the glass articles (in most cases cylinders) could be drawn with safety. Another disadvantage consisted in the rapid deterioration of the baits due to the repeated welding and removal of various glass layers which caused a pitting of the surface of the bait. The heating and cleaning of these baits also involved large items of expense. The baits had to be made relatively massive in order to retain the heat necessary to prevent cracking during the drawing operation so that it was not feasible to heat the baits by placing them in the glass, separate heating furnaces being required for this purpose.

My invention is designed to overcome all of the above recited objections, and briefly stated, this is accomplished by employing a bait having a glass engaging portion of a metal with its coefficient of expansion substantially the same as that of glass. This glass engaging portion preferably consists of a composition with a low carbon iron content of 55 per cent., and a nickel content of 45 per cent., but it will be understood that the invention is not limited to the use of these elements or to the proportions stated. Since the metal and the glass which welds thereto have the same coefficient of expansion, the glass article will never crack from the bait due to changes in temperature or to the gradual cooling as the drawing progresses. The glass article may, therefore, be drawn to any desired length without danger of breaking.

The glass engaging portion of the bait is preferably made separate from the supporting portion in order to reduce expense and to give the glass engaging portion greater freedom of movement under changes of temperature, but this is not necessarily the case and the invention may be embodied in a variety of forms other than those illustrated. Since there is no requirement that the glass engaging portion of the bait should retain its heat during the drawing operation, this portion may be made relatively thin and light and as a result the engaging portion can be readily brought to welding temperature with the glass by merely inserting it in the glass, thus avoiding the necessity of heating the bait by a separate furnace or other means as was the case with the hot baits as heretofore used.

There is also no pitting or wearing away of the bait since the glass does not partially crack from the bait as was the case with the old hot baits, and it is possible to use the bait without cleaning, the strip of glass remaining at the edge of the bait after the glass article is cut off, forming a satisfactory bait for a new draw, so that the surface of the metal is not exposed to deterioration.

It is also possible with this bait, when used for cylinder drawing, to draw a full sized cylinder from beginning to end, which operation was impractical with the old hot baits or with the cold baits which have largely taken their place, and wherein it was necessary to employ a bait of relatively smaller diameter than the cylinder, thus giving the cylinder a reduced end and neck. This reduced end and neck not only involve a waste of glass but require a very considerable amount of skill in forming and a loss of time, all of which objections are avoided by the use of the new bait having the same diameter as the cylinder to be produced.

In the construction shown in Fig. 1, the numeral 1 designates the usual air supply pipe, 2 is the supporting portion of the bait which may be made of iron or any other suitable metal, and 3 is the glass engaging portion to which the upper end of the cylinder 4 is shown as attached. The glass engaging portion 3 is made of the iron and nickel composition heretofore referred to, and is mounted upon the portion 2 so that there is a space 5 to permit the portion 3 to move freely relative to the supporting portion.

The glass engaging portion 3 is caused to engage the body of glass from which the cylinder is drawn by inserting its lower edge into the molten glass which soon heats the edge of the bait to a temperature at which the glass will adhere thereto. The cylinder is then drawn in the usual way, severed from the bath of glass at its lower end, and moved to a horizontal position. The cylinder is then cut away from the bait at a point closely adjacent the lower edge of the portion 3, and the bait is again ready for reuse by dipping the lower glass covered edge thereof into the molten glass and drawing as before. It is, of course, possible to clean the lower edge of the bait of the glass adhering thereto before starting a new draw, but this procedure has the disadvantage incident to the labor involved in loosening the glass and to the wearing away of the metal caused by the repeated cleaning.

Fig. 2 illustrates a modified form of cylinder drawing bait wherein 6 is the air supply pipe, 7 is the supporting portion, and 8 is the glass engaging portion, such glass engaging portion being recurved at its upper end and hooking over the annular ridge or projection 9 on the upper surface of the supporting portion. As in the other type of construction space is provided between two parts of the bait to permit of the free expansion and contraction of the glass engaging portion.

Figs. 3 and 4 illustrate one application of the invention to the drawing of flat sheets, wherein 10 is a bait supporting portion carrying a glass engaging portion 11 formed of a metal having substantially the same coefficient of expansion as the glass, as in the other type of construction. The part 10 is provided with rivets 12 extending through slots 13 in the part 11 so as to permit of the free relative movement of the glass engaging portion. The reference numeral 14 in Fig. 4 indicates the adhering sheet of glass.

Fig. 5 illustrates a further modification of the sheet drawing bait wherein the glass engaging portion 15 is supported from the part 16 by means of the links 17 which permit of the free relative movement of the part 15.

In the construction of Fig. 6 a slot is provided upon the supporting portion 18 by the use of a strip 19 riveted to the part 18. The glass engaging part 20 is provided along its upper edge with a shoulder 21 fitting in the groove formed upon the supporting part 18. This arrangement permits of the disengagement of the two parts by moving them relatively in a lateral direction, thus sliding the shoulder out of its supporting groove. The foregoing are illustrative of only a few of the possible embodiments of the invention.

Figs. 7 and 8 illustrate other modifications. In Fig. 7 the bait 22 is made of woven wire fabric of the metal having the same coefficient of expansion as glass, while in Fig. 8 the member 23 is of such metal, supported from the member 24 by the wire 25.

What I claim is:

1. A glass drawing bait having a glass engaging portion of a metal with a coefficient of expansion substantially the same as that of glass.

2. A glass drawing bait having a glass engaging portion of a low carbon iron and nickel composition having a coefficient of expansion substantially the same as that of glass, the nickel content being approximately forty five per cent.

3. A glass drawing bait comprising a supporting member, and an annular glass engaging member with a depending edge free to move with respect to the supporting member and composed of a metal having a coefficient of expansion substantially the same as that of glass.

4. A glass drawing bait having an annular glass engaging portion of relatively light thin formation and consisting of a metal having a coefficient of expansion substantially the same as that of glass.

5. A glass drawing bait comprising a supporting member, and an annular glass engaging member free to move with respect to the supporting member and composed of an iron and nickel composition having a coefficient of expansion substantially the same as that of glass.

6. The process of drawing glass cylinders which consists in immersing the relatively thin lower edge of a metal bait of a material having substantially the same coefficient of expansion as glass, in a body of molten glass, permitting the bait to remain in the glass until the glass is welded thereto, drawing the bait upward, severing the cylinder thus produced at a point adjacent the bait, immersing the annular glass edge left upon the bait in the body of molten glass and drawing another cylinder.

7. The process of drawing a glass cylinder which consists in immersing the relatively thin lower edge of a metal bait of a material having substantially the same coefficient of expansion as glass in a body of molten glass, permitting the bait to remain in the glass until the glass is welded thereto, and then drawing the bait upward.

8. The process of drawing a glass cylinder, which consists in welding to the lower edge of a circular metal bait of a material having substantially the same coefficient of expansion as the glass, an annular glass lip, lowering the bait so that the lip enters a bath of molten glass, and then drawing the bait upward.

HALBERT K. HITCHCOCK.